US006407182B1

(12) United States Patent
Maul et al.

(10) Patent No.: US 6,407,182 B1
(45) Date of Patent: Jun. 18, 2002

(54) FREE-FLOWING TRANSPARENT POLYAMIDE MOLDING COMPOSITION

(75) Inventors: Juergen Maul, Marl; Georg Oenbrink, Duelmen; Harald Haeger, Marl; Hans-Peter Hauck; Ralf Richter, both of Recklinghausen, all of (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/768,286

(22) Filed: Jan. 25, 2001

(30) Foreign Application Priority Data

Jan. 25, 2000 (DE) .......................................... 100 02 948

(51) Int. Cl.⁷ .............................................. C08L 77/00
(52) U.S. Cl. ...................................... 525/432; 525/435
(58) Field of Search .................................. 525/432, 435

(56) References Cited

U.S. PATENT DOCUMENTS

| | | | |
|---|---|---|---|
| 3,442,975 A | | 5/1969 | Cawthon et al. |
| 4,250,297 A | * | 2/1981 | Nielinger et al. ............ 528/340 |
| 5,321,079 A | | 6/1994 | Torre et al. .................... 525/66 |
| 5,321,118 A | | 6/1994 | Torre et al. ................... 528/338 |

FOREIGN PATENT DOCUMENTS

CA  2039136  7/1992

OTHER PUBLICATIONS

Siegmann et al, "Polyblends Containing a Liquid Crystalline Polymer", Polymer, vol. 26, pp. 1325–1330 (Aug. 1985).
Frihart et al, "Polyamide Processing Aids for Nylon", Plast. COPD. 1990, 13(3), 109–110.

* cited by examiner

Primary Examiner—Ana Woodward
(74) Attorney, Agent, or Firm—Oblon, Spivak, McClelland, Maier & Neustadt, P.C.

(57) ABSTRACT

Transparent molding compositions are prepared by blending from 50 to 99 parts by weight of a transparent polyamide, and from 1 to 50 parts by weight of a graft copolymer, such that the sum of the parts by weight of the transparent polyamide and the graft copolymer is 100. The graft copolymer is prepared by reacting from 0.5 to 25% by weight, based on the graft copolymer, of a branched polyamine having at least 4 nitrogen atoms and having a number average molecular weight $M_n$ of at least 146 g/mol, with polyamide-forming monomers selected from the group consisting of lactams, ω-aminocarboxylic acids, equimolar combinations of diamine and dicarboxylic acid, and combinations thereof.

13 Claims, No Drawings

FREE-FLOWING TRANSPARENT POLYAMIDE MOLDING COMPOSITION

BACKGROUND OF THE INVENTION

1. Field of the Invention

The invention relates to free-flowing transparent polyamide molding compositions having substantially unimpaired mechanical properties.

2. Discussion of the Background

Transparent copolyamides are generally distinguished over other materials by good low-temperature impact strength and good chemical resistance; in addition, they have high light transparency together with an amorphous structure, which provides good shrinkage behavior. Such materials can be used to produce molded articles having superior properties. However, transparent polyamide compositions have a high melt viscosity, which makes processing them considerably more difficult than other types of molding compositions. For example, thin-walled injection-molded articles can be produced from transparent copolyamides only with difficulty.

Plastics can usually be rendered more free-flowing by lowering the number average molecular weight. However, this generally also results in a significant impairment of the mechanical properties. In the case of polyamides, the impact strength in particular is drastically reduced by lowering the number average molecular weight of the polymer below a critical value.

Another way of improving the flow behavior of plastics is to add so-called flow improvers. Low molecular weight additives are frequently employed for this purpose. In the case of transparent plastics, however, additives of this type frequently result in a loss in transparency or in the formation of deposits in the mold during processing.

CA-A 2,039,136 describes amorphous polyamides having improved flow behavior which are obtained by adding certain types of carbon black to the polyamides. DE-A 3728 334 describes the improvement in the flow of amorphous polyamides by addition of polyolefins grafted with maleic anhydride. A. Siegmann et al. (Polymer, 1985, 26(9), 1325–1330) were able to reduce the melt viscosity of amorphous polyamides by the addition of liquid crystalline polyesters. In all of these cases however, the additives destroy the transparency of the amorphous polyamides.

C.F. Frihart et al. (Plast. Copd. 1990, 13(3), 109–110) were able to reduce the melt viscosity of an amorphous polyamide by adding at least 1% by weight of an additional amorphous polyamide based on a dimeric fatty acid ($C_{36}$-dicarboxylic acid). However, this procedure results in a significant reduction in the modulus of elasticity of the blend.

U.S. Pat. No. 3,442,975 suggests that a polyethyleneimine-PA 6 graft copolymer can be used as flow aid for PA 6. However, this is a crystalline, opaque polyamide, and the mixture of polyethyleneimine-PA 6 graft copolymer with PA 6 is also opaque.

SUMMARY OF THE INVENTION

The object of the present invention is to develop free-flowing transparent polyamide molding compositions which do not have the above-mentioned disadvantages of the prior art, and whose mechanical properties, in particular tensile strength, modulus of elasticity, flexural strength and impact strength, are only slightly impaired compared to the unmodified transparent polyamides. This is achieved by blending the transparent polyamide with a graft copolymer formed from a branched polyamine and polyamide-forming monomers.

DETAILED DESCRIPTION OF THE INVENTION

The molding composition of the present invention comprises the following components:

I) from 50 to 99 parts by weight, preferably from 75 to 98 parts by weight and particularly preferably from 85 to 97 parts by weight, of a transparent polyamide, and II) from 1 to 50 parts by weight, preferably from 2 to 25 parts by weight and particularly preferably from 3 to 15 parts by weight, of a graft copolymer prepared from the following monomers:

a) from 0.5 to 25% by weight, preferably from 1 to 20% by weight and particularly preferably from 1.5 to 16% by weight, based on the graft copolymer, of a branched polyamine having at least 4, preferably at least 8 and particularly preferably at least 11 nitrogen atoms and having a number average molecular weight Mn of at least 146 g/mol and preferably of at least 500 g/mol, and b) polyamide-forming monomers selected from lactams, ω-aminocarboxylic acids and/or equivalent combinations of diamine and dicarboxylic acid, where the sum of the parts by weight of I) and II) is 100.

Transparent polyamides are known (Kunststoffhandbuch [Plastics Handbook] 3/4, Editors G. W. Becker and G. Braun, pp. 803 ff., Carl Hanser Verlag Munich, Vienna, 1998). Transparent polyamides which are suitable for the purposes of the invention are also described, for example, in the following publications: U.S. Pat. No. 2,742,496, CH-B-480 381, CH-B-679 861, DE-A-22 25 938, DE-A-26 42 244, DE-A-27 43 515, DE-A-29 36 759, DE-A-27 32 928, DE-A-43 10 970, EP-A-0 053 876, EP-A-0 271 308, EP-A-0 313 436, EP-A- 0 725 100 and EP-A-0 725 101.

The transparent polyamides used in accordance with the present invention, which can also be in the form of copolyamides, are prepared, for example, from the following monomers:

branched or unbranched aliphatic diamines having 6 to 14 carbon atoms, for example, 1,6-hexamethylenediamine, 2-methyl-1,5-diaminopentane, 2,2,4- or 2,4,4-trimethylhexamethylenediamine, 1,9-nonamethylenediamine, 1,10-decamethylenediamine or 1,12-dodecamethylenediamine;

cycloaliphatic diamines having 6 to 22 carbon atoms, for example, 4,4'-diaminodicyclohexylmethane, 3,3'-dimethyl-4,4'-diaminodicyclohexylmethane, 4,4'-diaminodicyclohexylpropane, 1,4-diaminocyclohexane, 1,4-bis(aminomethyl)cyclohexane, 2,6-bis(aminomethyl)norbornane or 3-aminomethyl-3,5,5-trimethylcyclohexylamine;

araliphatic diamines having 8 to 22 carbon atoms, for example, m- or p-xylylenediamine or bis(4-aminophenyl)propane;

branched or unbranched aliphatic dicarboxylic acids having 6 to 22 carbon atoms, for example, adipic acid, 2,2,4- or 2,4,4-trimethyladipic acid, azelaic acid, sebacic acid or 1,12-dodecanedioic acid;

cycloaliphatic dicarboxylic acids having 6 to 22 carbon atoms, for example, cyclohexane-1,4-dicarboxylic acid, 4,4'-dicaboxydicyclohexylmethane, 3,3'-dimethyl-4,4'-dicarboxydicyclohexylmethane, 4,4'- dicarboxydicyclohexylpropane and 1,4-bis (carboxymethyl)cyclohexane;

araliphatic dicarboxylic acids having 8 to 22 carbon atoms, for example, 4,4'-diphenylmethanedicarboxylic acid;

aromatic dicarboxylic acids having 8 to 22 carbon atoms, for example isophthalic acid, tributylisophthalic acid, terephthalic acid, 1,4-, 1,5-, 2,6- or 2,7-naphthalenedicarboxylic acid, diphenic acid or 4,4'-oxybis(benzoic acid), lactams having 6 to 12 carbon atoms or the corresponding aminocarboxylic acids, such as, for example, 6-caprolactam, 6-aminocaproic acid, caprylolactam, ω-amipocaprylic acid, ω-aminoundecanoic acid, laurolactam or ω-aminododecanoic acid.

Examples of transparent polyamides which can be used in accordance with the invention are as follows:

the copolyamide made from terephthalic acid and the isomer mixture of 2,2,4- and 2,4,4-trimethylhexamethylenediamine, the polyamide made from isophthalic acid and 1,6-hexamethylenediamine, the copolyamide made from a mixture of terephthalic acid/isophthalic acid and 1,6-hexamethylenediamine, the copolyamide made from isophthalic acid, 3,3'-dimethyl-4,4'-diaminodicyclohexylmethane and laurolactam or caprolactam, the polyamide or copolyamide made from 1,12-dodecanedioic acid, 3,3'-dimethyl-4,4'-diaminodicyclohexylmethane and, if desired, laurolactam or caprolactam, the copolyamide made from isophthalic acid, 4,4'-diaminodicyclohexylmethane and laurolactam or caprolactam, the polyamide made from 1,12-dodecanedioic acid and 4,4'-diaminodicyclohexylmethane, the copolyamide made from a terephthalic acid/ isophthalic acid mixture, 3,3'-dimethyl-4,4'-diaminodicyclohexylmethane and laurolactam.

The branched polyamine can be, for example, any of the following classes of polyamines:

dendrimers, for example, $((H_2N—(CH_2)_3)_2N—(CH_2)_3)_2$-$N(CH_2)_2$-$N((CH_2)_2$—$N((CH_2)_3$—$NH_2)_2)_2$ (DE-A-196 54179)or tris(2-aminoethyl)amine, N, N-bis(2-aminoethyl)-N',N'-bis{2-{bis(2-aminoethyl)amino}ethyl}-1,2-ethanediamine or 3,15-bis(2-aminoethyl)-6, 12-bis{2-{bis(2-aminoethyl)amino}ethyl}-9-{2{bis{2-bis(2-aminoethyl)amino}ethyl}amino}ethyl}-3,6,9,12,15-pentaazaheptadecane-1,17-diamine (J. M. Warakomski, Chem. Mat. 1992, 4, 1000–1004);

branched polyethyleneimines, which are obtainable by polymerization of aziridines (Houben-Weyl, Methoden der Organischen Chemie {Methods of Organic Chemistry}, Volume E20, pages 1482–1487, Georg Thieme Verlag Stuttgart, 1987) and which generally have the following amino group distribution:

from 25 to 46% of primary amino groups, from 30 to 45% of secondary amino groups and from 16 to 40% of tertiary amino groups.

In the preferred case, the polyamine has a number average molecular weight $M_n$ of at most 20,000 g/mol, particularly preferably of at most 10,000 g/mol and particularly preferably of at most 5000 g/mol.

The polyamide-forming monomers employed can be any of the monomers mentioned above for the transparent polyamide, in particular lactams and/or ω-aminocarboxylic acids. Particular preference is given to ε-caprolactam, ω-aminoundecanoic acid and/or laurolactam, the latter primarily if the transparent polyamide comprises a substantial proportion of copolymerized laurolactam. However, it is also possible to employ an equivalent combination of diamine and dicarboxylic acid, if desired, together with a lactam and/or an ω-aminocarboxylic acid.

In one possible embodiment, the graft copolymer may be prepared with the additional use of an oligocarboxylic acid selected from 0.015 to about 3 mol % of dicarboxylic acid and 0.01 to about 1.2 mol % of tricarboxylic acid, in each case based on the sum of the moles of the other polyamide-forming monomers. In this connection, each monomer in the combination of diamine and dicarboxylic acid is considered individually.

If a dicarboxylic acid is used, the amount added to the graft copolymer is preferably from 0.03 to 2.2 mol %, particularly preferably from 0.05 to 1.5 mol %, very particularly preferably from 0.1 to 1 mol % and in particular from 0.15 to 0.65 mol %. If a tricarboxylic acid is used, the amount added to the graft copolymer is preferably from 0.02 to 0.9 mol %, particularly preferably from 0.025 to 0.6 mol %, very particularly preferably from 0.03 to 0.4 mol % and in particular from 0.04 to 0.25 mol %. The concomitant use of the oligocarboxylic acid significantly improves the solvent and hydrolysis resistance of the graft copolymer.

The oligocarboxylic acid employed can be any desired di- or tricarboxylic acid having 6 to 24 carbon atoms, for example adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

In addition, if desired, aliphatic, alicyclic, aromatic, aralkyl- and/or alkylaryl-substituted monocarboxylic acids having 3 to 50 carbon atoms, such as, for example, lauric acid, unsaturated fatty acids, acrylic acid or benzoic acid, can be employed as a regulator. By means of these regulators, the concentration of amino groups can be reduced without changing the shape of the molecule.

The graft copolymers according to the invention can be prepared by various processes. One possibility is to initially introduce the lactam or ω-aminocarboxylic acid and polyamine together and to carry out the polymerization or polycondensation. The oligocarboxylic acid can be added either at the beginning or during the reaction. However, a preferred two-step process comprises first carrying out the lactam cleavage and prepolymerization in the presence of water (alternatively, the corresponding ω-aminocarboxylic acids or diamines and dicarboxylic acids are employed and prepolymerized directly). In the second step, the polyamine is added, while any oligocarboxylic acid used concomitantly is metered in before, during or after the prepolymerization. The mixture is then held under reduced pressure at temperatures of from 200 to 290° C. and polycondensed in a stream of nitrogen or under reduced pressure.

A further preferred process comprises the hydrolytic degradation of a polyamide to a prepolymer and the simultaneous or subsequent reaction with the polyamine. Preference is given to polyamides in which the end group difference is approximately zero or in which any oligocarboxylic acid used concomitantly has already been copolycondensed. However, the oligocarboxylic acid can also be added at the beginning or during the degradation reaction.

These processes allow the preparation of ultra-highly branched polyamides having acid numbers of less than 40 mmol/kg, preferably less than 20 mmol/kg and particularly preferably less than 10 mmol/kg. After a reaction time of only from one to five hours at temperatures of from 200° C. to 290° C., approximately complete conversion is achieved.

If desired, this can be followed, in a further process step, by holding the graft copolymer thus formed under vacuum for a number of hours. Fir example, this step may last at least four hours, preferably at least six hours and particularly preferably at least eight hours at a temperature of from 200 to 290° C. After an induction period of several hours, an increase in the melt viscosity of the polymer is then observed, which is probably attributable to a reaction of amino end groups with one another, together with elimination of ammonia and the formation of crosslinks.

If it is not desired to continue the reaction to completion in the melt, the graft copolymer can also be post-condensed in the solid phase by conventional methods for polyamides.

The transparent polyamide and the graft copolymer can be mixed with one another by any conventional method. For example, the mixing may be carried out in the melt in a compounding unit.

The molding composition according to the invention can also contain conventional auxiliaries and additives used in transparent polyamides, for example, flame retardants, stabilizers, plasticizers, glass fibers or other polymers which do not impair the transparency of the molding composition. The amount of all additives is in total a maximum of 40 parts by weight, preferably a maximum of 30 parts by weight and particularly preferably a maximum of 20 parts by weight.

Moldings can be produced from the molding composition by any conventional method, for example by extrusion, blow molding, thermoforming and, in particular, injection molding. The molding composition according to the present invention is also excellently suited for the extrusion coating of any desired surface.

Having generally described this invention, a further understanding can be obtained by reference to certain specific examples which are provided herein for purposes of illustration only, and are not intended to be limiting unless otherwise specified.

EXAMPLE 1

(Preparation of a polyethyleneimine-PA 6 graft copolymer)

56.58 kg of ε-caprolactam and 0.094 kg of dodecanedioic acid were melted at from 180 to 210° C. in a heated kettle and metered into a pressure-tight polycondensation reactor. 5% by weight of water and 57 ppm of $H_3PO_2$ were then added. The pressure imposed on the mixture was then reduced to a residual steam pressure of 3 bar over the course of 3 hours, and 5% by weight of polyethyleneimine (Lupasol G100, BASF AG, Ludwigshafen) were metered in. The polyethyleneimine was incorporated at the ambient pressure established under these conditions. The mixture was subsequently decompressed to atmospheric pressure, and the reaction was continued to completion over the course of 5 hours at 240° C. while nitrogen was passed over the mixture. The clear melt was discharged as an extrudate via a spinning wheel pump, cooled in a water bath and granulated. The graft copolymer thus formed had the following properties:

$\eta_{rel}$: 1.23
Melting point $T_m$: 209° C.
The granules were opaque.

EXAMPLE 2

95 parts by weight of a transparent polyamide made from 50 mol % of terephthalic acid and 50 mol % of an isomer mixture of 2,2,4- and 2,4,4-trimethylhexamethylenediamine were mixed in the melt with 5 parts by weight of the graft copolymer prepared in Example 1, during which the material temperature was held within the range from 280° C to 320° C. The product was extruded and granulated. Transparent standard test specimens were produced from the granules by injection molding. The results are shown in Table 1. For comparison, the table also contains the corresponding data for the unmodified polyamide, which was not mixed with a graft copolymer.

EXAMPLE 3

As Example 2, but with 90 parts by weight of the polyamide and 10 parts by weight of the graft copolymer. Here too, transparent test specimens were obtained.

Table 1 shows that the mechanical properties of the molding compositions according to the invention are at the same level as those of the unmodified polyamide.

The priority document of the present application, German patent application 10002948.5 filed Jan. 25, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

TABLE 1

Basic mechanical properties

| Property | Method | Unit | Example 2 | Example 3 | For comparison: transparent polyamide employed |
|---|---|---|---|---|---|
| Impact strength (CHARPY) | ISO 179/IeU | | | | |
| 23° C. | | kJ/m² | no break | no break | no break |
| 0° C. | | kJ/m² | no break | no break | no break |
| −30° C. | | kJ/m² | no break | 4/10 no break | no break |
| Notched impact strength (CHARPY) | ISO 179/IeA | | | | |
| 23° C. | | kJ/m² | 10 | 9 | 11 |
| 0° C. | | kJ/m² | 9 | 9 | 10 |
| −30° C. | | kJ/m² | 6 | 6 | 7 |
| Shore hardness D | DIN 53505 | | 87 | 88 | 87 |
| Ball impression hardness H 30 | ISO 2039 | N/mm² | 165 | 172 | 178 |

TABLE 1-continued

Basic mechanical properties

| Property | Method | | Unit | Example 2 | Example 3 | For comparison: transparent polyamide employed |
|---|---|---|---|---|---|---|
| Tensile test | 50 mm/min | ISO 527 | | | | |
| Yield stress | | | N/mm$^2$ | 91 | 95 | 88 |
| Elongation | | | % | 7 | 7 | 8 |
| Tensile strength | | | N/mm$^2$ | 65 | 63 | 63 |
| Tensile elongation | | | % | >150 | >150 | >100 |
| Modulus of elasticity (tensile test) | | DIN 53457-t | N/mm$^2$ | 3140 | 3200 | 2670 |
| Flexural test | 5 mm/min | ISO 178 | | | | |
| Flexural strength | | | N/mm$^2$ | 154 | 156 | 155 |
| 3.5% flexural stress | | | N/mm$^2$ | 100 | 103 | 107 |
| Outer fiber strain at flexural strength | | | % | 10 | 9 | 9 |
| Modulus of elasticity (flexural test) | | DIN 53457-B3 | N/mm$^2$ | 2900 | 3080 | 3085 |
| Melt viscosity at 280° C. and a shear rate of | | | | | | |
| 10 [l/s] | | High-pressure capillary | [Pas] | 4100 | 2850 | 8250 |
| 100 [l/s] | | rheometry | [Pas] | 2050 | 1800 | 3500 |

What is claimed as new and is intended to be secured by Letters Patent is:

1. A transparent molding composition which comprises the following components:

I) from 50 to 99 parts by weight of a transparent polyamide, and

II) from 1 to 50 parts by weight of a graft copolymer prepared using the following monomers:

a) from 0.5 to 25% by weight, based on the graft copolymer, of a branched polyamine having at least 4 nitrogen atoms and having a number average molecular weight M$_n$ of at least 146 g/mol, and b) graft polymerized polyamide-forming monomers selected from the group consisting of lactams, ω-aminocarboxylic acids, equimolar combinations of diamine and dicarboxylic acid, and combinations thereof, where the sum of the parts by weight of I) and II) is 100.

2. The molding composition of claim 1, which comprises
   I) from 75 to 98 parts by weight of the transparent polyamide and
   II) from 2 to 25 parts by weight of the graft copolymer.

3. The molding composition of claim 1, which comprises
   I) from 85 to 97 parts by weight of the transparent polyamide and
   II) from 3 to 15 parts by weight of the graft copolymer.

4. The molding composition of claim 1, wherein the graft copolymer is prepared from monomers comprising 1 to 20% by weight of a branched polyamine.

5. The molding composition of claim 1, wherein the graft copolymer is prepared from monomers comprising 1.5 to 16% by weight of a branched polyamine.

6. The molding composition of claim 1, wherein the branched polyamine has at least 8 nitrogen atoms.

7. The molding composition of claim 1, wherein the branched polyamine has at least 11 nitrogen atoms.

8. The molding composition of claim 1, wherein the branched polyamine has a number average molecular weight of at least 500 g/mol.

9. The molding composition of claim 1, wherein the transparent polyamide is selected from the group consisting of:

the copolyamide made from terephthalic acid and the isomer mixture of 2,2,4- and 2,4,4-trimethylhexamethylenediamine, the polyamide made from isophthalic acid and 1,6-hexamethylenediamine, the copolyamide made from a mixture of terephthalic acid/isophthalic acid and 1,6-hexamethylenediamine, the copolyamide made from isophthalic acid, 3,3'-dimethyl-4,4'-diaminodicyclohexylmethane and laurolactam, the copolyamide made from isophthalic acid, 3,3'-dimethyl-4,4'-diaminodicyclohexylmethane and caprolactam, the polyamide made from 1,12-dodecanedioic acid and 3,3'-dimethyl-4,4'-diaminodicyclohexylmethane, the copolyamide made from 1,12-dodecanedioic acid, 3,3'-dimethyl-4,4'-diaminodicyclohexylmethane and laurolactam, the copolyamide made from 1,12-dodecanedioic acid, 3,3'-dimethyl-4,4'-diaminodicyclohexylmethane and caprolactam, the copolyamide made from 1,12-dodecanedioic acid, 3,3'-dimethyl-4,4'-diaminodicyclohexylmethane and laurolactam and caprolactam, the copolyamide made from isophthalic acid, 4,4'-diaminodicyclohexylmethane and laurolactam, the copolyamide made from isophthalic acid, 4,4'-diaminodicyclohexylmethane and caprolactam, the polyamide made from 1,12-dodecanedioic acid and 4,4'-diaminodicyclohexylmethane, the copolyamide made from a terephthalic acid/isophthalic acid mixture, 3,3'-dimethyl-4,4'-diaminodicyclohexylmethane and laurolactam.

10. The molding composition of claim 1, wherein the polyamine is selected from the group consisting of
    dendrimers and
    branched polyethyleneimines.

11. The molding composition of claim 1, wherein the graft copolymer additionally contains an oligocarboxylic acid selected from 0.015 to 3 mol % of a dicarboxylic other than said dicarboxylic acid of b) acid and 0.01 to 1.2 mol % of a tricarboxylic acid, in each case based on the amount of the polyamide-forming monomers.

12. The molding composition of claim 1, wherein the graft copolymer additionally contains a regulator comprising a monocarboxylic acid other than said ω-aminocarboxylic acid of b) having 3 to 50 carbon atoms.

13. A molding produced from the molding composition of claim 1.

* * * * *